United States Patent Office 3,480,645
Patented Nov. 25, 1969

3,480,645
PROCESS FOR OPTICAL RESOLUTION OF RACEMIC PANTOLACTONE
Noriyuki Okuda, Tokyo, Ieji Kuniyoshi, Ichikawa-shi, and Tadashi Saito and Koji Oguri, Tokyo, Japan, assignors to Daiichi Seiyaku Company, Limited, Nihonbashi, Chuo-ku, Tokyo, Japan
No Drawing. Filed Dec. 19, 1966, Ser. No. 602,493
Claims priority, application Japan, Dec. 25, 1965, 40/79,618
Int. Cl. C07d 27/60; C07c 101/72
U.S. Cl. 260—326.14                1 Claim

ABSTRACT OF THE DISCLOSURE

Alkali or alkaline earth metal salts of L-amino acids are added to racemic pantolactone; the thus obtained mixture of the corresponding metal salts of N-(D-pantoyl)-L-amino acid and N-(L-pantoyl)-L-amino acid is desalted to produce a mixture of the free acids; the N-(D-pantoyl)-L-amino acid is separated from the other in water; and mineral acid is added to each of the acids to produce D(—)-pantolactone and L(+)-pantolactone.

---

It has been known that pantothenic acid which is a structural component of coenzyme A is an important vitamin and between enantiomers thereof only D(+)-pantothenic acid has a physiological activity. In order to produce D(+)-pantothenic acid from racemic pantolactone, D(—)-pantolactone must be first produced by optically resolving pantolactone which has been obtained by a chemical synthesis.

For the optical resolution of racemic pantolactone, there have hitherto been known methods of using as a resolving agent a natural organic base such as quinine (U.S. Patent No. 2,319,545), brucine (U.S. Patent No. 2,390,281, No. 2,474,719 and No. 2,967,869), strychinine (U.S. Patent No. 2,423,062) or ephedrine (U.S. Patent No. 2,460,239 and No. 2,460,240); a method using an amino-sugar such as galactamine (British Patent No. 773,174); methods of using L(+)-α-phenylethylamine (Pharmazie, 12, 254 (1957), German Patent No. 16,482 and U.S. Patent No. 3,185,710); and methods of using L(+)-threo-1-(p - nitrophenyl)-2-amino - 1,3 - propanediol (German Patent No. 16,982 and No. 37,505). However, these known methods having various faults and hence are unsatisfactory for an industrial practice. For example, in the case of using a resolving agent among the said natural organic bases, the resolving agent is very expensive and at times difficult to be available as well as is poisonous, and further the yield of thus obtained D(—)-pantolactone is not always good. Moreover, for recovering the resolving agent, an extraction procedure with an organic solvent is required and, for conducting the recovery economically, a specific care must be taken for recovering the resolving agent completely. Also in the case of using other resolving agents than the natural organic bases such as L(+)-α-phenylethylamine, the resolving agent must be prepared by a complicated procedure, that is, by the optical resolution of racemic α-phenylethylamine using D-tartaric acid or the other optically active resolving agents, and the yield of the L(+)-α-phenylethylamine is low, which makes the method very costly.

As mentioned above, in producing D(—)-pantolactone commercially by hitherto-known methods, there are the following troubles; (1) the optically active agents are very expensive, (2) complicated procedures are required for recovering the resolving agents, and (3) the yield of D(—)-pantolactone is not always good.

Therefore, the inventors have carried out an extensive study for overcoming aforesaid difficulties and have now completed a commercially profitable method for the optical resolution of racemic pantolactone by using as the resolving agent an inexpensive and easily available optically active L-amino acid.

It is an object of the present invention, therefore, to provide an economical method for the resolution of racemic pantolactone.

Another object of the present invention is to provide new intermediates involved in the new process for resolving racemic pantolactone.

The other objects and advantages of the present invention will become apparent from the detailed description given hereinafter.

The above objects as well as the other objects have been unexpectedly achieved in the following manner.

In accordance with the present invention, racemic pantolactone is reacted with an alkali or an alkaline earth metal salt of optically active L-amino acid, and the produced mixture of the corresponding metal salt of N-(D-pantoyl)-L-amino acid and N-(L-pantoyl)-L-amino acid is dissolved in water and desalted to produce the mixture of the free acids, then the free acids are separated utilizing the difference in solubility thereof in water, and finally the acids are each cleaved to produce D(—)-pantolactone and L(+)-pantolactone.

In practising the process of the present invention, the optically active L-amino acid which is used as a resolving agent may be suitably selected from the group consisting of L-leucine, and L-tryptophan. A so-called "L-leucine fraction," such as "Leucinine" (trademark of Ajinomoto Co., Japan), which is obtained from a hydrolyzate of a natural protein such as gluten, corn or casein, and which contains other amino acids in small amounts than the main component, L-leucine, can also be used in the present invention. Therefore, it should be understood that the term "L-leucine" used in the claims which follow hereinafter also includes the "L-leucine fraction." They are converted into an anhydrous salt of an alkali metal such as sodium or potassium metal or of an alkaline earth metal such as calcium, barium or magnesium metal by treating them with an equimolar amount of an alkali or alkaline earth metal alcoholate or hydroxide.

The molar ratio of the salt of the L-amino acid to racemic pantolactone is preferably 1:1, but one of them may be used excessively without exerting bad influences on the purities of the products, and the excessive ingredient can be recovered afterwards. The reaction of pantolactone with the salt of the L-amino acid is conducted in the presence or absence of a suitable solvent. The solvents to be used must be inert to the starting materials and the products. Lower alcohols such as methanol, ethanol or isopropanol are preferably used. In the case of using no solvent, the reaction is completed by heating the reaction system at 80°–150° C. for 1–10 hours to fuse the mixture. In the case of using a solvent, though the reaction can also be conducted at an ordinary room temperature, heating under reflux completes the reaction in a shorter period of time, usually in 1–10 hours. The reaction temperature and the reaction period of time may be varied a little depending upon the kind of the solvents to be employed.

Thus obtained mixture of the alkali metal salts or the alkaline earth metal salts of N-(D-pantoyl)-L-amino acid and N-(L-pantoyl)-L-amino acid is dissolved in a suitable quantity of water, and then by adding thereto a mineral acid such as hydrochloric acid or sulfuric acid, or by treating the solution with a cation exchange resin the salts are desalted to give N-(D-pantoyl)-L-amino acid and N-(L-pantoyl)-L-amino acid. The two free acids are different in solubility in water, that is N-(D-pantoyl)-L-amino acid is insoluble in water while N-(L-pantoyl)-L-amino acid is soluble in water. Hence, when the two free acids are present in water, only N-(D-pantoyl)-L-amino acid is precipitated while N-(L-pantoyl)-L-amino acid remains being dissolved in water. Consequently, by recovering the precipitate by filtration and washing with water, highly pure N-(D-pantoyl)-L-amino acid can be obtained in a good yield.

Hydrolysis of N-(D-pantoyl)-L-amino acid and N-(L-pantoyl)-L-amino acid and subsequent relactonization of the formed pantoic acid can be carried out simultaneously by heating aqueous solutions thereof under reflux. The reaction can be accelerated in the presence of a mineral acid such as hydrochloric acid or sulfuric acid, preferably maintaining the reaction mixture at a pH of below 2.0. In these manners the reaction can be completed in a period of 0.5–6 hours in the presence of a sufficient amount of a mineral acid.

The reaction mixture is subjected to extraction with a suitable organic solvent such as dichloroethane, chloroform, trichloroethylene, ethylacetate or isobutyl acetate, and the solvent is removed by distillation from the extract to provide highly pure D(−)-pantolactone in a high yield above 80%, while, by neutralizing the residual solution to adjust the pH thereof the isoelectric point of the used amino acid the amino acid can be recovered in a high yield above 95%.

Moreover, if necessary, after removing the excessive racemic pantolactone therefrom by extraction, the mother liquor from which N-(D-pantoyl)-L-amino acid has been separated is heated in the similar manner as in the case of N-(D-pantoyl)-L-amino acid in the presence of a mineral acid and the resulting solution is subjected to extraction with said organic solvent to provide highly pure L(+)-pantolactone in a high yield, and from the residual solution the L-amino acid can be recovered similarly in a good yield. However, if the recovery of pure L(+)-pantolactone is unnecessary, the crude L(+)-pantolactone may be racemized by heating in the presence of an alkali in a usual manner and the resulting racemized product may be used again for the optical resolution.

As mentioned above, according to the process of the present invention, racemic pantolactone can be easily optically resolved using an easily available and inexpensive L-amino acid as the resolving agent to provide D(−)-pantolactone and L(+)-pantolactone in high yields, and the L-amino acid used as the resolving agent can also be recovered easily in a high yield.

The present invention will now be illustrated by the following examples. Of course, the present invention shall not be limited to the following examples.

Example 1

In 20 ml. of anhydrous methanol was dissolved 1.14 g. (0.05 mole) of metallic sodium to prepare a methanol solution of sodium methylate. After 6.56 g. (0.05 mole) of L-leucine was dissolved therein, 6.50 g. (0.05 mole) of racemic pantolactone was added to the resulting solution, and the mixture was heated under reflux for 6 hours. After the reaction was finished, methanol was removed by distillation to provide a syrup, which was dissolved in 100 ml. of water. The pH of the aqueous solution was adjusted to 2.4 with dilute hydrochloric acid to precipitate crystals, which were recovered by filtration, washed with water and dried to provide 5.68 g. (yield: 87%) of white needles having a melting point of 157° C. (dec.) and $[\alpha]_D^{20}+21.0°$ (c.=1, methanol). By the elementary analysis and the infrared absorption spectrum, the product was confirmed to be N-(D-pantoyl)-L-leucine.

Elementary analysis: Calculated for $C_{12}H_{23}O_5N$ (M.W. 261.32): C, 55.15; H, 8.87; N, 5.36. Found: C, 54.97; H, 8.88; N, 5.42. Infrared Absorption Spectrum (cm.$^{-1}$) 3240, 1733, 1627, 1545, 1200.

In water was suspended 5.68 g. of thus obtained N-(D-pantoyl)-L-leucine, and the suspension was heated under reflux for 30 minutes with the addition of 1.9 ml. of concentrated hydrochloric acid. After cooling, the reaction mixture was extracted with each 10 ml. of chloroform five times. After the extract was dried over anhydrous sodium sulfate, chloroform was removed by distillation and the residue was allowed to cool, whereupon it was immediately crystallized. By recrystallization thereof from a mixture of benzine and ligroin, there was obtained 2.64 g. (yield: 93%) of white needles of D(−)-pantolactone having a melting point of 90°–91° C. and $[\alpha]_D^{20}-50.3°$ (c.=2, water).

On the other hand, the mother liquor from which N-(D-pantoyl)-L-leucine had been separated was combined with the washings, and the mixture was subjected to extraction with chloroform to recover unchanged racemic pantolactone, and the residual solution was acidified with hydrochloric acid and refluxed for 30 minutes. Thereafter, the reaction mixture was concentrated to a volume of 50 ml. and then subjected to extraction with each 50 ml. of chloroform five times. The extract was dried over anhydrous sodium sulfate, chloroform was removed by distillation and the residue was allowed to cool to provide 2.98 g. of crude L(+)-pantolactone. By recrystallization thereof from a mixture of petroleum ether and ether, there was obtained 2.23 g. (yield: 68%) of white needles having a melting point of 90°–91° C. and $[\alpha]_D^{20}+50.0°$ (c.=2, water).

Further, the mother liquor from which D(−)-pantolactone and L(+)-pantolactone had been removed by said chloroform extraction were combined together, and the pH of the mixture was adjusted to 5.8–6.0 with a dilute aqueous sodium hydroxide solution, whereupon crystals were immediately precipitated, and they were recovered by filtration to provide 6.23 g. (yield: 96%) of L-leucine having a melting point of 293°–295° C. and $[\alpha]_D^{20}+15.2°$ (c.=1, 6 N HCL).

Example 2

In water was suspended 5.2 g. (0.02 mole) of N-(D-pantoyl)-L-leucine obtained by a similar method as in Example 1, and the suspension was refluxed for 30 minutes with the addition of 1.2 ml. of concentrated sulfuric acid. After cooling, the reaction mixture was subjected to extraction with each 10 ml. of chloroform five times. The extract was dried over anhydrous sodium sulfate and chloroform was removed by distillation. The residue was allowed to cool, whereupon it was immediately crystallized. By recrystallization thereof from a mixture of benzene and ligroin, there was obtained 2.42 g. (yield: 93%) of D(−)-pantolactone having a melting point of 90°–90° C. and $[\alpha]_D^{20}-50.0°$ (c.=2, water).

The residual solution from which D(−)-pantolactone had been extracted was neutralized to pH 5.8 with a dilute sodium hydroxide solution, whereupon crystals were immediately separated, and they were recovered by filtration to provide 2.47 g. (yield: 95%) of L-leucine having a melting point of 293°–295°C. (dec.) and $[\alpha]_D^{20}-15.2°$ (c.=1, 6 N HCL).

Example 3

In 450 ml. of water were dissolved 24.6 g. (0.188 mole) of L-leucine and 7.3 g. (0.099 mole) of calcium hydroxide. After the mixture was stirred at 50° C. for 2 hours, the excessive calcium hydroxide was filtered off, and the filtrate was then evaporated to dryness in vacuo. The residue was recrystallized from 150 ml. of anhydrous methanol to provide 25.4 g. of pure calcium salt of L-leucine having $[\alpha]_D^{20}-32°$ (c.=2, 6 N HCL).

In 53 ml. of anhydrous methanol was dissolved 22.5 g. (0.075 mole) of calcium salt of L-leucine, 25.6 g. (0.197 mole) of racemic pantolactone was added thereto and the mixture was refluxed for 6 hours. Then, methanol was evaporated to dryness. The residue, nearly colorless syrup, was dissolved in 125 ml. of water and the solution was acidified to be 2.4 of pH with dilute hydrochloric acid. Whereupon, crystals were precipitated, and they were recovered by filtration, washed with water, dried to provide 16.0 g. (yield: 82%) of N-(D-pantoyl)-L-leucine having a melting point of 157° C. (dec.) and $[\alpha]_D^{20}+21°$ (c.=1, methanol).

Thus obtained N-(D-pantoyl)-L-leucine was cleaved in a similar manner as in Example 1, whereby 7.3 g. (yield: 91%) of D(−)-pantolactone having a melting point of 90°–91° C. and $[\alpha]_D^{20}-50.5°$ (c.=2, water) was obtained.

On the other hand, the mother liquor from which N-(D-pantoyl)-L-leucine had been separated was combined with the washings, and the mixture was extracted with chloroform to recover unchanged racemic pantolactone, and the residual solution was acidified with hydrochloric acid and refluxed for 30 minutes. Thereafter, the reaction mixture was concentrated to a volume of 50 ml. and then subjected to extraction with each 50 ml. of chloroform five times. Then, in a similar manner as in Example 1, 11.5 g. of crude L(+)-pantolactone was obtained from the chloroform extract. By recrystallization thereof from a mixture of petroleum ether and ether, 8.7 g. (yield: 89%) of pure L(+)-pantolactone having the melting point of 90°–91° C. and $[\alpha]_D^{20}(+)50.3°$ (c.=2, water) was obtained.

Further, L-leucine was recovered in a similar manner as in Example 1 from the residual solution from which D(−)-pantolactone and L(+)-pantolactone had been separately extracted. Yield: 18.7 g. (95%), melting point: 293°–295° C. (dec.), $[\alpha]_D^{20}+15.2°$ (c.=1, N, HCL).

Example 4

After 15.0 g. (0.05 mole) of calcium salt of L-leucine obtained by the same method as in Example 3 was mixed with 13.0 g. (0.10 mole) of racemic pantolactone, the mixture was heated at 120–130° C. for 10 hours. The reaction mixture became a colorless syrup. Thereafter, it was dissolved in 200 ml. of water and the pH of the solution was adjusted to 2.4 with dilute hydrochloric acid. Whereupon, crystals were precipitated, and they were recovered by filtration, washed with water, dried to provide 10.2 g. (yield: 78%) of N-(D-pantoyl)-L-leucine having a melting point of 157° C. and $[\alpha]_D^{20}+21.0°$ (c.=1, methanol).

According to the same method as described in Example 1, there were obtained 4.8 g. (yield: 94%) of D(−)-pantolactone having the melting point of 90°–91° C. and $[\alpha]_D^{20}-50.3°$ (c.=2, water), 4.7 g. (yield: 72%) of L(+)-pantolactone having the melting point of 90°–91° C. and $[\alpha]_D^{20}+50.0$ (c.=2, water), and 12.8 g. (yield: 98%) of L-leucine having a melting point of 293°–295° C. and $[\alpha]_D^{20}+15.2°$ (c.=1, 6 N HCL).

Example 5

In 20 ml. of anhydrous methanol was dissolved 1.14 g. (0.05 mole) of metallic sodium to prepare a methanol solution of sodium methylate.

After 10.2 g. (0.05 mole) of L-tryptophan was dissolved therein, 6.50 g. (0.05 mole) of racemic pantolactone was added to the resulting solution and the mixture was allowed to stand in the dark at a room temperature for 40 hours. After the reaction was finished, methanol was evaporated to dryness in vacuo. The residue, nearly colorless syrup, was dissolved in 100 ml. of water and was acidified to pH 2.4 with dilute hydrochloric acid to precipitate crystals, which were recovered by filtration, washed with water, and dried to provide 7.4 g. (yield 89%) of white needles having a melting point of 159° C. $[\alpha]_D^{20}+41.5°$ (c.=1, methanol). By the elementary analysis and the infrared absorption spectrum, the product was confirmed to be N-(D-pantonyl)-L-tryptophan.

Elementary analysis: Calculated for $C_{17}H_{22}O_5N$ (M.W. 333.44), C, 61.07; H, 6.63; N, 8.37. Found: C, 61.28; H, 6.68; N, 8.43. Infrared Absorption Spectrum (cm.$^{-1}$) 3350, 1750, 1650, 1550.

In 1000 ml. of water was suspended 7.4 g. of thus obtained N-(D-pantoyl)-L-tryptophan and the suspension was acidified to pH 1.5 with dilute hydrochloric acid and then refluxed for 6 hours. The reaction mixture was concentrated to a volume of 50 ml. After cooling, crystallized L-tryptophan was recovered and washed with 100 ml. of water to provide 3.85 g. (yield: 85%) of L-tryptophan having a melting point of 252° C. (dec.) and $[\alpha]_D^{20}-31.5°$ (c.=0.48, water).

D(−)-pantolactone was extracted with each 30 ml. of dichloroethane five times from the motor liquor from which L-tryptophan had been separated. After the extract was dried over anhydrous sodium sulfate, dichloroethane was removed by distillation and the residue was allowed to cool to be immediately crystallized. By recrystallization thereof from trichloroethylene, there was obtained 2.7 g. (yield: 93%) of white needles of D(−)-pantolactone having a melting point of 90°–91° C. and $[\alpha]_D^{20}-50.5°$ (c.=2, water).

On the other hand, the mother liquor from which N-(D-pantoyl)-L-tryptophan had been separated was combined with the washings, and the mixture was subjected to extraction with dichloroethane to recover unchanged racemic pantolactone, the residual solution was acidified to be 1.5 of pH with dilute hydrochloric acid and refluxed for 6 hours. Thereafter, the reaction mixture was concentrated to a volume of 50 ml. After cooling, crystallized L-tryptophan was recovered, washed with 100 ml. of water, and dried to provide 5.3 g. (yield: 93%) of L-tryptophan having a melting point of 250° C. (dec.) and $[\alpha]_D^{20}-31.0°$ (c.=0.48, water).

L(+)-pantolactone was extracted with each 50 ml. of dichloroethane five times from the motor liquor from which L-tryptophan had been separated. After the extract was dried over anhydrous sodium sulfate, dichloroethane was removed by distillation and the residue was allowed to cool to provide 2.94 g. of crude L(+)-pantolactone. By recrystallization thereof from a mixture of petroleum ether and ether, there was obtained 2.30 g. (yield: 71%) of white needles of L(+)-pantolactone having a melting point of 90°–91° C. and $[\alpha]_D^{20}+50.0°$ (c.=2, water).

Example 6

In 26.0 ml. of anhydrous methanol was dissolved 17.25 g. (0.75 mole) of metallic sodium to prepare a methanol solution of sodium methylate. After 98.4 g. of "Leucinine" (L-leucine 90.7%, L-isoleucine 7.6%, and L-valine 1.7%) was added thereto, 130 g. (1.0 mole) racemic pantolactone was added to the resulting solution, and the mixture was refluxed for 6 hours. After the reaction was finished, methanol was removed by distillation from the reaction mixture. The residue was dissolved in 800 ml. of water, and the pH of the solution was adjusted to 2.4 with dilute hydrochloric acid. Whereupon, crystals were precipitated, and they were recovered by filtration, washed with water and dried to provide 78.5 g. (yield: 80%) of white crystals of N-(D-pantoyl)-L-leucine having a melting point of 155°–156° C. (dec.) and $[\alpha]_D^{20}+20.4°$ (c.=1, methanol).

In 125 ml. of water was suspended 78.5 g. of thus obtained N-(D-pantoyl)-L-leucine and the suspension was refluxed for 30 minutes with the addition of 30 ml. of concentrated hydrochloric acid. After cooling, the resulting solution was extracted with each 200 ml. of dichloroethane five times. After the extract was dried over anhydrous sodium sulfate, dichloroethane was removed by distillation and the residue was allowed to cool, whereupon 36.6 g. of crude D(−)-pantolactone was immediately crystallized. By recrystallization thereof from trichloroethylene, there was obtained 31.1 g. (yield: 80%) of white needles of D(−)-pantolactone having the melting point of 90°–91° C. and $[\alpha]_D^{20}-50.5°$ (c.=2, water). The pH of the residual solution was adjusted to 6.0 with a dilute aqueous sodium hydroxide solution to precipitate crystals, which were recovered by filtration, washed with water and dried to provide 36.6 g. (yield: 93%) of L-leucine having a melting point of 293°–295° C. (dec.) and $[\alpha]_D^{20}+15.4°$ (c.=1, 6 N HCL).

On the other hand, the mother liquor from which N-(D-pantoyl)-L-leucine had been separated was combined with the washings, and the mixture was subjected to extraction with each 700 ml. of dichloroethane five times to recover unchanged racemic pantolactone and the residual solution was refluxed for 4 hours. Thereafter, the reaction mixture was concentrated to a volume of 320 ml., whereupon crystals were precipitated, and they were recovered by filtration, washed with water and dried to provide 45 g. (yield: 76%) of L-leucine.

Then, 6 ml. of concentrated hydrochloric acid was added to the mother liquor. After the mixture was heated under reflux for one hour, the reaction solution was subjected to extraction with each 30 ml. of dichloroethane five times. After the extract was dried over anhydrous sodium sulfate, dichloroethane was removed by distillation and the residue was recrystallized from benzene to provide 28.5 g. (yield: 58.5%) of L(+)-pantolactone having a melting point of 90°–91° C. and $[\alpha]_D^{20}+50.0°$ (c.=2, water).

What is claimed is:
1. N-(D-pantoyl)-L-tryptophan.

References Cited

UNITED STATES PATENTS 2,805,219  9/1957  Kagan et al. ___ 260—343.6 XR
3,185,710  5/1965  Dunkel et al. _____ 260—343.6

OTHER REFERENCES

Drell et al.: Chem. Abs. 43:722h abs. of J. Am. Chem. Soc., 70:2057–63 (1948).

Nielsen et al.: Chem. Abs. 40:6128 abs. of Aeta. Pharmacol. Toxicol. 1:207–18 (1945).

ALEX MAZEL, Primary Examiner

J. A. NARCAVAGE, Assistant Examiner

U.S. Cl. X.R.

260—343.6, 519, 534